(12) United States Patent
Kremer et al.

(10) Patent No.: US 10,645,886 B2
(45) Date of Patent: May 12, 2020

(54) METHODS AND APPARATUS FOR GNOTOBIOTIC PLANT GROWTH

(71) Applicant: BOARD OF TRUSTEES OF MICHIGAN STATE UNIVERSITY, East Lansing, MI (US)

(72) Inventors: James Kremer, Lansing, MI (US); James M. Tiedje, Lansing, MI (US); Sheng-Yang He, Okemos, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 255 days.

(21) Appl. No.: 15/417,522

(22) Filed: Jan. 27, 2017

(65) Prior Publication Data

US 2017/0215351 A1 Aug. 3, 2017

Related U.S. Application Data

(60) Provisional application No. 62/288,498, filed on Jan. 29, 2016.

(51) Int. Cl.
*A01G 22/00* (2018.01)
*A01G 7/00* (2006.01)
(Continued)

(52) U.S. Cl.
CPC ............... *A01G 22/00* (2018.02); *A01G 7/00* (2013.01); *A01G 9/02* (2013.01); *A01G 31/02* (2013.01);
(Continued)

(58) Field of Classification Search
CPC .... A01G 2009/003; A01G 9/02; A01G 31/02; A01G 9/028
See application file for complete search history.

(56) References Cited

U.S. PATENT DOCUMENTS 2,134,098 A * 10/1938 Babcock .................. A01G 7/04
219/408
4,121,524 A * 10/1978 Voelskow ............... A61L 11/00
110/220
(Continued)

FOREIGN PATENT DOCUMENTS

WO    WO-0183690 A2 * 11/2001 ............. A01G 31/02

OTHER PUBLICATIONS

Trofymow, "A Gnotobiotic Plant Microcosm" Plant and Soil 55, 167-170, 1980 (Year: 1980).*
(Continued)

*Primary Examiner* — Magdalena Topolski
(74) *Attorney, Agent, or Firm* — Marshall, Gerstein & Borun LLP

(57) ABSTRACT

The disclosure relates to a plant growth apparatus and related system to grow and maintain plants under controlled biotic conditions, for example to grow axenic (microbe-free) plants, gnotobiotic (defined microbiota) plants, and holoxenic (complex, or undefined microbiota) plants. This system allows aseptic bottom irrigation with water, soluble nutrients, chemicals, and/or microbiota. Plants can be inverted for dipping and/or vacuum infiltration. The system also allows for passive (gravity) drainage, thereby allowing for gas exchange and preventing root anoxia. A variety of plant growth substrates can be used within the plant growth apparatus as a plant growth medium. The plant growth apparatus, containing the growth substrate medium, can be completely flushed via the drainage port to remove potential toxic byproducts of the sterilization processes. The entire system is suitably constructed using autoclavable material.

23 Claims, 7 Drawing Sheets

(51) Int. Cl.
A01G 9/02 (2018.01)
A01G 31/02 (2006.01)
A01G 24/00 (2018.01)
A01G 9/00 (2018.01)

(52) U.S. Cl.
CPC ............. *A01G 9/00* (2013.01); *A01G 24/00* (2018.02); *Y02P 60/216* (2015.11)

(56) References Cited

U.S. PATENT DOCUMENTS

| | | | | |
|---|---|---|---|---|
| 9,144,206 | B1* | 9/2015 | Rubanenko | A01G 31/02 |
| 2005/0032211 | A1* | 2/2005 | Shaaltiel | C12M 23/14 |
| | | | | 435/420 |
| 2012/0137581 | A1* | 6/2012 | Teasdale | A01G 31/02 |
| | | | | 47/66.6 |
| 2016/0088804 | A1* | 3/2016 | Ooi | A01G 22/00 |
| | | | | 47/17 |
| 2018/0325055 | A1* | 11/2018 | Krakover | A01G 31/06 |
| 2018/0368344 | A1* | 12/2018 | Marshall | A01G 31/02 |
| 2019/0008095 | A1* | 1/2019 | Onishi | A01G 9/00 |

OTHER PUBLICATIONS

Strissel, "Bacteria Free Soybean Plants". Iowa State University Capstones, Theses, and Dissertations. 1970 (Year: 1970).*
He, "FlowPot axenic plant growth system for microbiota research" (Year: 2018).*
Hale, Hameed, "Gnotobiotic Culture of Plants and Related Research" The botanical review, vol. 39, No. 3, 1973 (Year: 1973).*
Abrams, G.D., Bauer, H., Sprinz, H., "Influence of the Normal Flora on Mucosal Morphology and Cellular Renewal in the Ileum; A Comparison of Germ-Free and Conventional Mice," *Lab. Invest.* 12:355-64 (1963).
Adams, C., Jacobson, A., Bugbee, B., "Ceramic Aggregate Sorption and Desorption Chemistry: Implications for Use as a Component of Soilless Media," *J. Plant Nutr.*, 37:1345-57 (2014).
Berns, A.E., Philipp, H., Narres, H.D., Burauel, P., Vereecken, H., Tappe, W., "Effect of Gamma-Sterilization and Autoclaving on Soil Organic Matter Structure as Studied by Solid State NMR, UV and Fluorescence Spectroscopy," *Eur. J. Soil Sci.*, 59(3):540-50 (2008).
Blankinship, J.C., Becerra, C.A., Schaeffer, S.M., Schimel, J.P., "Separating Cellular Metabolism from Exoenzyme Activity in Soil Organic Matter Decomposition," *Soil Biol. Biochem.*, 71:68-75 (2014).
Buchan, D., Moeskops, B., Ameloot, N., De Neve, S., Sleutel, S., Selective Sterilisation of Undisturbed Soil Cores by Gamma Irradiation: Effects on Free-Living Nematodes, Microbial Community and Nitrogen Dynamics, *Soil Biol. Biochem.*, 47:10-13 (2012).

Clough, S.J., Bent, A.F., "Floral Dip: A Simplified Method for Agrobacterium- Mediated Transformation of *Arabidopsis Thaliana*," Plant J., 16(6):735-43 (1998).
Gordon, H.A., Pesti, L., "The Gnotobiotic Animal as a Tool in the Study of Host Microbial Relationships," *Bacteriol. Rev.*, 35(4):390-429 (1971).
Gunning, T., Cahill, D.M., "A Soil-Free Plant Growth System to Facilitate Analysis of Plant Pathogen Interactions in Roots,", *J. Phytopathol.*, 157(7-8):497-501 (2009).
Henry, A., Doucette, W., Norton, J., Jones, S., Chard, J., Bugbee, B., "An Axenic Plant Culture System for Optimal Growth in Long-Term Studies," *J. Environ. Qual.*, 35:(2)590-98 (2006).
Jackson M.B., Abbott A., Belcher A.R., Hall K.C., Butler, R., Cameron, J., "Ventilation in Plant Ttissue Cultures and Effects of Poor Aeration on Ethylene and Carbon Dioxideaccumulation, Oxygen Depletion and Explant Development," *Ann. Bot.*, 67:229-37 (1991).
Katagiri, F., Thilmony, R., He, S.Y., "The *Arabidopsis Thaliana-Pseudomonas Syringae* Interaction," *The Arabidopsis book/ American Society of Plant Biologists.*, (2002).
Lebeis, S. L., et al., "Salicylic Acid Modulates Colonization of the Root Microbiome by Specific Bacterial Taxa," *Science*, 349:(6250)860-65 (2015).
Luckey, T. D., "Nutrition and Biochemistry of Germfree Chicks," *Ann NY Acad Sci.*, 78(1):127-65 (1959).
Round, J. L., Mazmanian, S. K., "The Gut Microbiota Shapes Intestinal Immune Responses During Health and Disease," *Nat. Rev. Immunol.*, 9(5):313-23 (2009).
Sahashi, N., Tsuji, H., Shishiyama, J., "Barley Plants Grown Under Germ-Free Conditions Have Increased Susceptibility to Two Powdery Mildew Fungi," Physiol. Mol. Plant Pathol., 34(2):163-70 (1989).
Schroth, K.J.W., "Plant Growth-Promoting Rhizobacteria and Plant Growth Under Gnotobiotic Conditions," *Phytopathol.*, 71(6):642-44 (1981).
Shaw, L.J., Beatonb, Y., Glover, L.A., Killham, K., Meharg, A.A., "Re-Inoculation of Autoclaved Soil as a Non-Sterile Treatment for Xenobiotic Sorption and Biodegradation Studies," *Appl. Soil Ecol.*, 11(2):217-26 (1999).
Urbanek, E., Bodi, M., Doerr, S.H., Shakesby, R.A., Influence of Initial Water Content on the Wettability of Autoclaved Soils, *Soil Sci. Soc. Am. J.* 74(6):2086-88 (2010).
Wagner, M.R., Lundberg, D.S., Coleman- Derr, D., Tringe, S.G., Dangl, J.L., Mitchell- Olds, T., "Natural Soil Microbes Alter Flowering Phenology and the Intensity of Selection on Flowering Time in a Wild Arabidopsis Relative," *Ecol. Lett.*, 17(6):717-26 (2014).
Wostmann, B.S., "The Germfree Animal in Nutritional Studies," *Annu. Rev. Nutr.*, 1(1):257-79 (1981).

* cited by examiner

METHODS AND APPARATUS FOR GNOTOBIOTIC PLANT GROWTH

CROSS REFERENCE TO RELATED APPLICATION

Priority is claimed to U.S. Provisional Application No. 62/288,498 (filed Jan. 29, 2016), which is incorporated herein by reference in its entirety.

STATEMENT OF GOVERNMENT INTEREST

This invention was made with government support under DE-FG02-91ER20021 awarded by the U.S. Department of Energy. The government has certain rights in the invention.

BACKGROUND OF THE DISCLOSURE

Field of the Disclosure

The disclosure relates to a plant growth apparatus and related system to grow and maintain plants under controlled biotic conditions, for example to grow axenic (microbe-free) plants, gnotobiotic (defined microbiota) plants, and holoxenic (complex, or undefined microbiota) plants. The apparatus and system allow aseptic bottom irrigation with water, soluble nutrients, chemicals, and/or microbiota.

Background

Pathogenic microorganisms affecting plant health are a major and chronic threat to food production and ecosystems worldwide. As agricultural production has grown over the past few decades, producers have become more and more dependent on agrochemicals as a relatively reliable method of crop protection. However, overuse and improper use of agrochemicals has caused several negative effects such as the development of pathogen resistance and non-target environmental impacts. Furthermore, the growing cost of pesticides and consumer demand for pesticide-free food has led to a search for substitutes for these products. There are also a number of problematic diseases for which agrochemical solutions are few, ineffective, or nonexistent. Biological control is thus an alternative or a supplemental way of reducing the use of agrochemicals.

Current methods for gnotobiotic studies can be complicated and are can create problems related to soluble toxin generation in soil. An older but still currently used method is sterilized soil in flask or pots. For example, inoculated sterile seeds are placed in 2-L flask (2-3 seed per flask) with soil that is twice autoclaved and stabilized for 2 weeks and sealed with cotton and tin foil. Plants are grown in a laminar flow hood and harvested 5 weeks after. Another method uses sterile CYG germination pouches or sterile phytatrays as pot replacements. A final method that avoids the complications (sterility, time, toxic byproducts from autoclaving) associated with soil, uses sterile sand and nutrients solution as a replacement in a glass tube.

SUMMARY

In current systems for gnotobiotic studies, irrigation is a difficult process, resulting in a subsequent plant growth process that is susceptible to contamination and root rot. Specifically, a major problem for current gnotobiotic systems is that sterilization methods (particularly autoclaving) can release soluble toxins from the soil, interfering with subsequent plant growth. The plant growth apparatus disclosed herein are adapted to permit flushing or rinsing of the plant growth substrate (e.g., soil or otherwise) to remove such toxins from the substrate, for example prior to inoculation with microorganisms and/or nutrient media, planting of seeds, etc. Other gnotobiotic systems that do not address this issue (e.g., in particular for soil-based gnotobiotic systems) are often unsuccessful for this reason. Thus, the disclosed plant growth apparatus and related systems are amenable to plant growth under carefully controlled biotic conditions, for example for experimental investigation of plant growth under one or more sets of controlled biotic conditions and/or one or more sets of controlled plant growth conditions (e.g., nutrient supplements, plant species) such as in a controlled experimental array. In some embodiments, the disclosed disclosed plant growth apparatus and related systems can be adapted to urban (or otherwise indoor) agricultural growth under controlled biotic conditions to provide products with particular microorganisms for plant nutrition, flavor manipulation, post-harvest durability, etc.

In one aspect, the disclosure relates to a plant growth apparatus comprising: (a) growth chamber having an internal volume and comprising (i) a fluid inlet and (ii) a fluid outlet; (b) a plant growth substrate contained within the growth chamber internal volume and constrained from exiting the internal volume via the fluid inlet and via the fluid outlet; (c) optionally one or more of a plant, a seedling thereof, and a seed thereof in the plant growth substrate; and (d) optionally a solid retaining means in the growth chamber internal volume and positioned between the fluid inlet and the plant growth substrate for restricting movement of the substrate into the fluid inlet while permitting movement of fluid through the fluid inlet into the growth chamber interior volume.

Various refinements and embodiments of the disclosed plant growth apparatus are possible. In a refinement, the fluid inlet comprises an inlet port. In another refinement, the fluid outlet comprises a perforated surface. In another refinement, the fluid inlet and the fluid outlet are positioned on different sides of the growth chamber. In another refinement, the plant growth substrate is sterilized. In another refinement, the plant growth substrate comprises a pre-determined set of one or more microorganism types. In another refinement, the plant growth substrate comprises one or more of soil, peat, vermiculite, fiberglass, calcined clay, synthetic soil substitutes, and blends thereof. In another refinement, the plant growth substrate comprises one or more of minerals, mineral colloids, organic colloids, and charcoal. In another refinement, the apparatus comprises one or more of a plant, a seedling thereof, and a seed thereof in the plant growth substrate. In another refinement, the solid retaining means comprises a plurality of beads (e.g., soda-glass beads).

In another aspect, the disclosure relates to a plant growth system comprising: (a) a hermetically sealable container having an internal volume and comprising: (i) a translucent external surface, and (ii) a microfilter as an external surface of the container, the microfilter being gas-permeable and microbe-impermeable; and (b) one or more plant growth apparatus according to any of the foregoing embodiments within the container internal volume, wherein (i) the fluid outlet of the plant growth apparatus is in fluid communication with the microfilter, and (ii) at least a portion of the growth chamber interior volume is in optical communication with the translucent external surface. In a refinement, the container is formed from a transparent polymeric material.

In another aspect, the disclosure relates to a method for growing a plant, the method comprising: (a) providing the plant growth apparatus according to any of the variously disclosed embodiments; (b) feeding sterilized water into the fluid inlet and through the plant growth substrate, thereby forming a flush eluent exiting from the fluid outlet; (c) feeding a liquid plant nutrient medium into the fluid inlet and through the plant growth substrate, thereby forming a nutrient eluent exiting from the fluid outlet; (d) (optionally) feeding a liquid inoculant into the fluid inlet and through the plant growth substrate, thereby forming an inoculant eluent exiting from the fluid outlet; (e) sowing one or more plant seeds into the plant growth substrate; then (f) sealing the plant growth apparatus in a hermetically sealable container having an internal volume and comprising: (i) a translucent external surface, and (ii) a microfilter as an external surface of the container, the microfilter being gas-permeable and microbe-impermeable, wherein the fluid outlet of the plant growth apparatus is in fluid communication with the microfilter, and at least a portion of the growth chamber interior volume is in optical communication with the translucent external surface; and (g) growing the plant in the container while preventing any microbial material from entering the sealed container during growth.

Various refinements and embodiments of the disclosed methods are possible. In a refinement, the method further comprises sterilizing (e.g., autoclaving) the plant growth substrate before feeding the sterilized water therethrough in part (b). For example, (i) the plant growth substrate can have been previously sterilized (e.g., by autoclaving) and comprise one or more water-soluble plant growth toxins before feeding the sterilized water therethrough in part (b); and (ii) feeding the sterilized water through the plant growth substrate in part (b) can remove at least some of the plant growth toxins from the plant growth substrate via the flush eluent (e.g., removes all or substantially all of the toxins, such by reducing the toxin level sufficiently to not inhibit subsequent plant growth). In another refinement, the liquid plant nutrient medium comprises Murashige and Skoog (MS) medium. In another refinement, the liquid plant nutrient medium and the liquid inoculant are in the form of a mixture fed together into the fluid inlet in parts (c) and (d). In another refinement, the liquid inoculant comprises an aqueous extract from a known soil source community. In another refinement, the liquid inoculant comprises microorganisms from a known culture medium. In another refinement, (i) the liquid inoculant comprises one or more known types of microorganisms, and (ii) growing the plant is gnotobiotic growth. In another refinement, (i) the liquid inoculant is sterilized (e.g., free or substantially free from live, active, viable, etc. microbes or microorganisms such as bacteria or viruses), and (ii) growing the plant is axenic growth. In another refinement, growing the plant comprises one or more of exposing the container to a light source and controlling the environmental temperature of the container.

In another refinement, the method can relate to the growth of plants in a plurality of different plant growth apparatus within the hermetically sealable container, where at least one of liquid plant nutrient type, liquid inoculant type, and plant type is varied among different growth apparatus (e.g., to provide an experimental matrix or array investigating the effect of one or more controlled growth conditions on resulting plant phenotype properties). For example part (a) can comprise providing a plurality of plant growth apparatus according to any of claims 1 to 10 for treatment according to parts (b)-(g). In a particular refinement, part (c) comprises providing a plurality of different liquid plant nutrient media (e.g., different nutrient specifies and/or concentrations); and feeding a selected liquid plant nutrient medium from the plurality into the fluid inlet and through the plant growth substrate; wherein each of the different liquid plant nutrient media is fed at least once to a selected plant growth apparatus from the plurality thereof. In an alternative or additional particular refinement, part (d) comprises: providing a plurality of different liquid inoculant media (e.g., different microorganism types, different distributions of microorganism types); and feeding a selected liquid inoculant medium from the plurality into the fluid inlet and through the plant growth substrate; wherein each of the different liquid inoculant media is fed at least once to a selected plant growth apparatus from the plurality thereof. In an alternative or additional particular refinement, part (e) comprises: providing a plurality of different plant seeds (e.g., different species, cultivars, etc.); and sowing one or more plant seeds selected from the plurality into the plant growth substrate; wherein each of the different plant seeds is sown at least once to a selected plant growth apparatus from the plurality thereof.

Additional features of the disclosure may become apparent to those skilled in the art from a review of the following detailed description, taken in conjunction with the drawings, examples, and appended claims.

BRIEF DESCRIPTION OF THE DRAWINGS

For a more complete understanding of the disclosure, reference should be made to the following detailed description and accompanying drawings wherein.

While the disclosed apparatus, systems, and methods are susceptible of embodiments in various forms, specific embodiments of the disclosure are illustrated (and will hereafter be described) with the understanding that the disclosure is intended to be illustrative, and is not intended to limit the claims to the specific embodiments described and illustrated herein.

DETAILED DESCRIPTION

The disclosure relates to a plant growth apparatus and related system (e.g., a small modular system) to grow and maintain plants under controlled biotic conditions, for example to grow axenic (microbe-free) plants, gnotobiotic (defined microbiota) plants, and holoxenic (complex, or undefined microbiota) plants. This system allows aseptic bottom irrigation with water, soluble nutrients, chemicals, and/or microbiota. Plants can be inverted for dipping and/or vacuum infiltration. The system also allows for passive (gravity) drainage, thereby allowing for gas exchange and preventing root anoxia. A variety of plant growth substrates can be used within the plant growth apparatus as a plant growth medium. The plant growth apparatus, containing the growth substrate medium, can be completely flushed via the drainage port to remove potential toxic byproducts of the sterilization processes. The entire system is suitably constructed using autoclavable material, thereby permitting the apparatus, system, and/or components thereof to be autoclaved individually or as an assembled unit.

FIGS. 1-7 illustrate a plant growth apparatus 10, a related plant growth system 20 incorporating the plant growth apparatus 10, related methods for growing plants using the apparatus 10 and system 20, and photographs of representative plants grown therewith.

Figure 1:
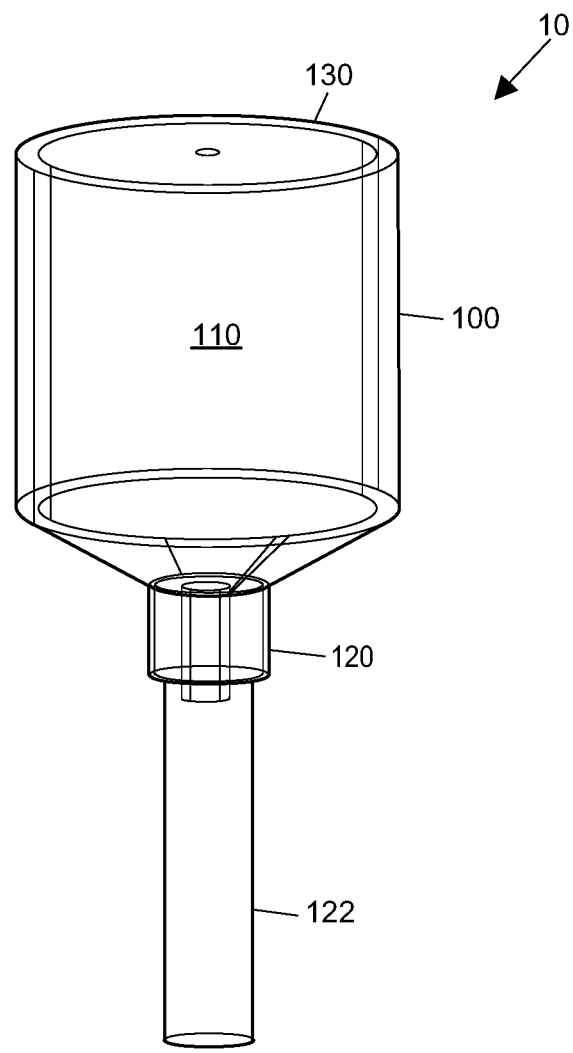
FIG. 1 illustrates a plant growth apparatus growth chamber according to the disclosure.
Figure 2:
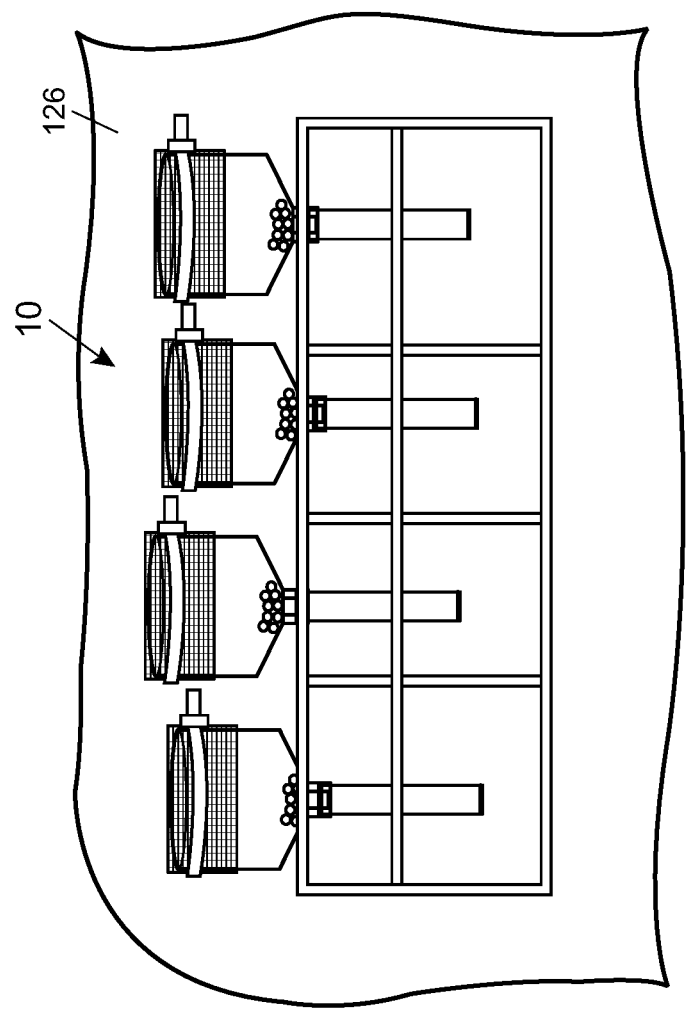
FIG. 2 illustrates a plant growth apparatus and an assembly method thereof according to the disclosure.
Figure 2:
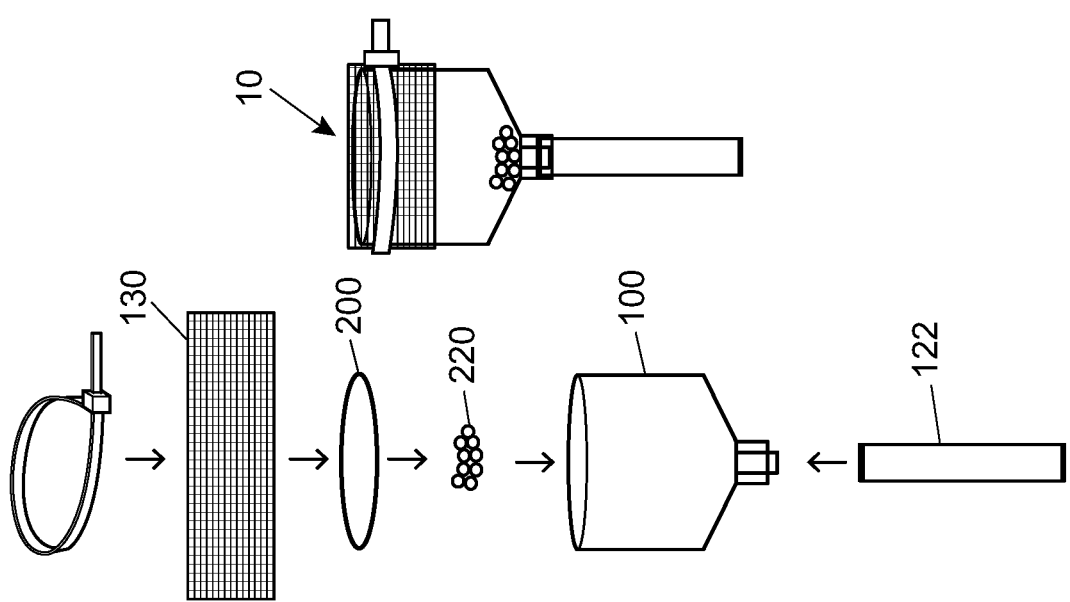
Figure 3:
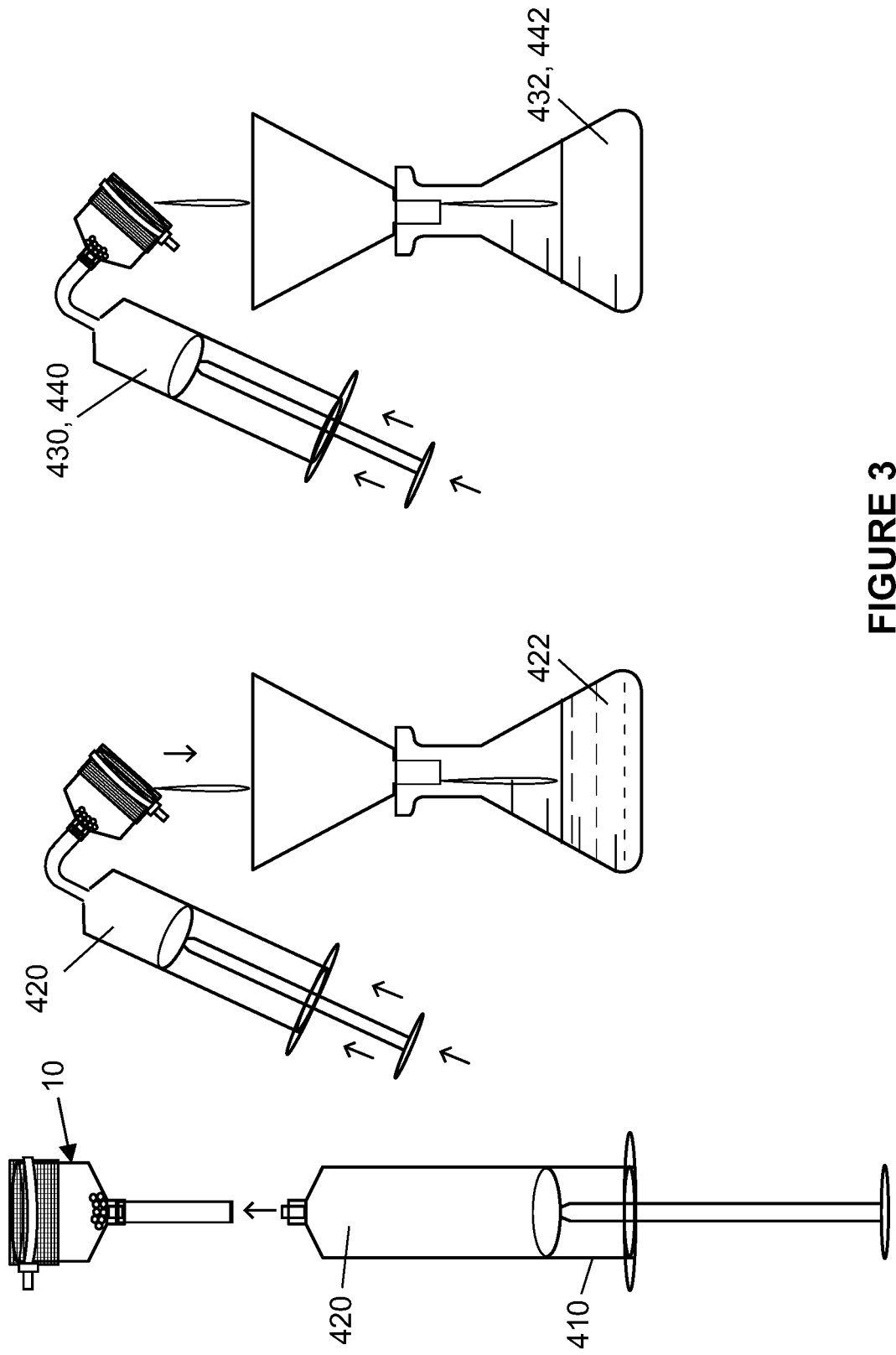
FIG. 3 illustrates an inoculation method for a plant growth apparatus according to the disclosure.

With specific reference to FIGS. 1 and 2, the plant growth apparatus 10 includes a growth chamber 100 having an internal volume 110 therein and including a fluid inlet 120 and a fluid outlet 130. The fluid inlet 120 and the fluid outlet 130 are suitably positioned on different sides of the growth chamber 100, for example on opposing sides as illustrated in the figures. Such relative positioning facilitates flushing, inoculating, and draining of liquids so that the fluid generally has better contact with a majority of the plant growth substrate 200 as it passes through the growth chamber 100 internal volume. Examples of such relative positioning include bottom/top, bottom/side, side/top, or otherwise opposing sides of chamber 100.

There are two primary components of the system 20, including the plant growth apparatus 10 (e.g., which contains the sterile plant growth substrate 200 described below) and the hermetically sealable container or chamber 300 (described below) in which individual apparatus 10 are contained for plant growth. For most suitable sterilization methods, all components of the system 20 are preferably autoclave-compatible or autoclave-safe, which can be defined as the component maintaining structural integrity after sterilization (e.g., at 121° C. and 15 psi for 45 minutes). In embodiments where some or all of the components of the system 20 are not autoclave-compatible or autoclave-safe, alternative sterilization methods may be used, such as hydrogen peroxide vapor and gamma-irradiation. The environment container or chamber 300 or a component thereof (e.g., its lid) is light-transmissive to permit an external light source to provide the required light energy for plant growth. Suitable materials for the system 20 components (e.g., growth chamber 100, container 300, etc.) which are autoclave-compatible or autoclave-safe and light-transmissive (e.g., transparent or translucent) include glass as well as a variety of polymers and copolymers such as polypropylenes (PP), polycarbonates (PC), poly(ethene-co-tetrafluoroethene) copolymers (ETFE), fluorinated ethylene propylenes (FEP), polypropylene co-polymers (PPCO), perfluoroalkoxy alkanes (PFA), polyketones (PK), polymethylpentenes (PMP), polysulfones (PSF), polytetrafluoroethylene (PTFE), polyurethanes (PUR), and various thermoplastic elastomers (TPE).

The specific geometry of the fluid inlet 120 and the fluid outlet 130 is not particularly limited. In an embodiment, the fluid inlet 120 can be or include an inlet port, for example an injection port or syringe port, such as a luer-style port (e.g., a threaded or non-threaded connector permitting connection between a male-taper fitting and its mating female part) The fluid inlet 120 (e.g., luer-style) on the growth chamber 100 also can be used for gravity drainage after flushing the chamber 100, and it need not be gas-tight or liquid-tight in such cases. More generally the fluid inlet 120 can be any opening to keep soil or other plant growth substrate 200 within the growth chamber 100 while allowing fluids through with sufficient pressure (e.g., gravity drainage with or without an additional driving applied pressure or vacuum). The inlet 120 is generally positioned on the bottom surface of the of the growth chamber 100 (e.g., relative to gravity in normal orientation during growth) to allow drainage of liquids accumulating in the plant growth substrate 200. In some embodiments, the inlet 120 can include an inlet tube 122 connected thereto to facilitate injection of various fluids (e.g., rinse fluids, nutrient media, microorganism media) into the growth chamber 100 as well as drainage of fluids therefrom. In an embodiment, the fluid outlet 130 can be or include a perforated surface. For example, the outlet 130 can be a screen or mesh with sufficiently small openings to retain the substrate 200 when the growth chamber 100 is inverted (e.g., to drain or flush fluids therefrom). More generally, the fluid outlet 130 can be any opening to keep soil or other plant growth substrate 200 within the growth chamber 100 while allowing fluids through with sufficient pressure (e.g., gravity drainage with or without an additional driving applied pressure or vacuum). The outlet 130 is generally positioned on the top surface of the of the growth chamber 100 (e.g., relative to gravity in normal orientation during growth) to allow drainage of liquids when the chamber is being flushed with liquid while inverted. The outlet 130 generally has a high fraction of open area to allow relatively free gas and liquid flow through the outlet 130.

The plant growth apparatus 10 further includes a plant growth substrate 200 contained within the growth chamber 100 internal volume 110, and it is constrained from exiting the internal volume 110 through the fluid inlet 120 and the fluid outlet 130. In an embodiment, the plant growth substrate 200 is sterilized, for example initially sterilized prior to use (e.g., for axenic growth conditions). The substrate 200 can be free or substantially free from all detectable active and dormant life, including insects, for example including active, dormant, or otherwise viable microorganisms such as bacteria, fungi, oomycetes, algae, amoeba, etc. In other embodiments, the plant growth substrate 200 can be initially sterilized before use, but then inoculated with a controlled or known set of microorganisms (e.g., for gnotobiotic growth conditions) or with an uncontrolled or unknown set of microorganisms (e.g., for holoxenic growth conditions) before plant growth as described below.

In other embodiments, the plant growth substrate 200 can include a pre-determined set of one or more microorganism types (e.g., for gnotobiotic growth conditions) or a non-pre-determined set of one or more microorganism types (e.g., for holoxenic growth conditions). For example, the plant growth substrate 200 can be selected so that it is known to contain only a set of desired microbes for gnotobiotic growth, such as resulting from initial sterilization followed by inoculation with a controlled or otherwise know microbial source. In various refinements, the plant growth apparatus 10 can be pre-inoculated with a pure cultures of a microorganism, communities of microorganisms (e.g., bacteria, fungi, oomycetes, etc.) derived from cultures (hereafter defined communities), as well as with complex undefined communities derived from the environment, such as by directly inoculating with a soil slurry rather than isolating individual microorganisms from the soil. This allows users to directly compare the phenotypic effects of the presence/absence of particular microbial taxa on the plant by eliminating environmental/abiotic variability intrinsic to testing plant growth in different soils. Furthermore, it allows users to compare the effect of microorganisms (or communities of microorganisms) on plant phenotypes as compared to axenic plants, thereby eliminating potentially confounding effects of native microbiota on sensitive assays. The apparatus 10 can also be inoculated with attenuated microorganisms or culture supernatants to determine whether microbial patterns or exudates influence the plant phenotype.

The specific materials for the plant growth substrate 200 are not particularly limited and can include any of the various materials known in the art for growing plants. For example the plant growth substrate 200 can include one or more of soil, peat, vermiculite, rockwool, fiberglass, calcined clay, synthetic soil substitutes, and blends thereof. Alternatively or additionally, the plant growth substrate 200 can include one or more of minerals (e.g., gravel, sand, silt), mineral colloids (e.g., soil clays such as alumino-silica clays, amorphous clays, sesquioxide clays), organic colloids (e.g., lignins, complex carbohydrates, waxes, fats), charcoal, and blends thereof. The plant growth substrate 200 in any of its various forms generally has a granular or particulate structure, thus permitting flow of gas and/or liquid through the substrate 200 medium in the apparatus 10.

In some embodiments, the plant growth apparatus 10 includes one or more of a plant 210, a seedling thereof, and a seed thereof in the plant growth substrate 200. For example, the plant growth apparatus 10 as provided to a user can be pre-assembled to contain the plant, seedling, or seed 210 (e.g., having been planted or sown therein). In other embodiments, the plant growth apparatus 10 as provided can be free from plants, seedlings, and or seeds (e.g., where such seeds are to be subsequently sown, plants planted, etc., such as by a user of the apparatus 10). The specific type of plant 210 is not particularly limited. In some embodiments, the particular plant species 210 is selected such that its shoot size is small enough to penetrate through the fluid outlet 130 as the plant 210 grows. For example, when the fluid outlet 130 is perforated or otherwise contains a plurality of orifices, such as the perforated mesh screen illustrated herein, the orifice size (e.g., mesh size) is suitably large enough to permit growth of the particular plant species 210 therethrough, yet small enough to contain the plant growth substrate 200 and prevent the same from escaping the internal volume 110 when the chamber 100 is inverted. In some embodiments, Brassicaceous plants and other plants with a similarly small shoot diameter can be used.

In some embodiments, the plant growth apparatus 10 includes a solid retaining means 220 in the growth chamber 100 internal volume 110. The solid retaining means 220 is suitably positioned between the fluid inlet 120 and the plant growth substrate 200 for restricting movement of the substrate 200 into the fluid inlet 120 while permitting movement of fluid through the fluid inlet 120 into the growth chamber 100 interior volume 110. In an embodiment, the solid retaining means 220 can include a plurality of beads (e.g., soda-glass beads) or granular solids, for example having a diameter (e.g., mean diameter or range of diameters) from about 1 mm or 2 mm to about 3 mm, 4 mm or 5 mm. The solid retaining means 220, in for example the bead embodiment thereof, serves a mechanical purpose of preventing soil or other plant substrate 200 components from escaping or clogging the fluid inlet 120 while simultaneously permitting fluid drainage or other flow therethrough.

Figure 4:
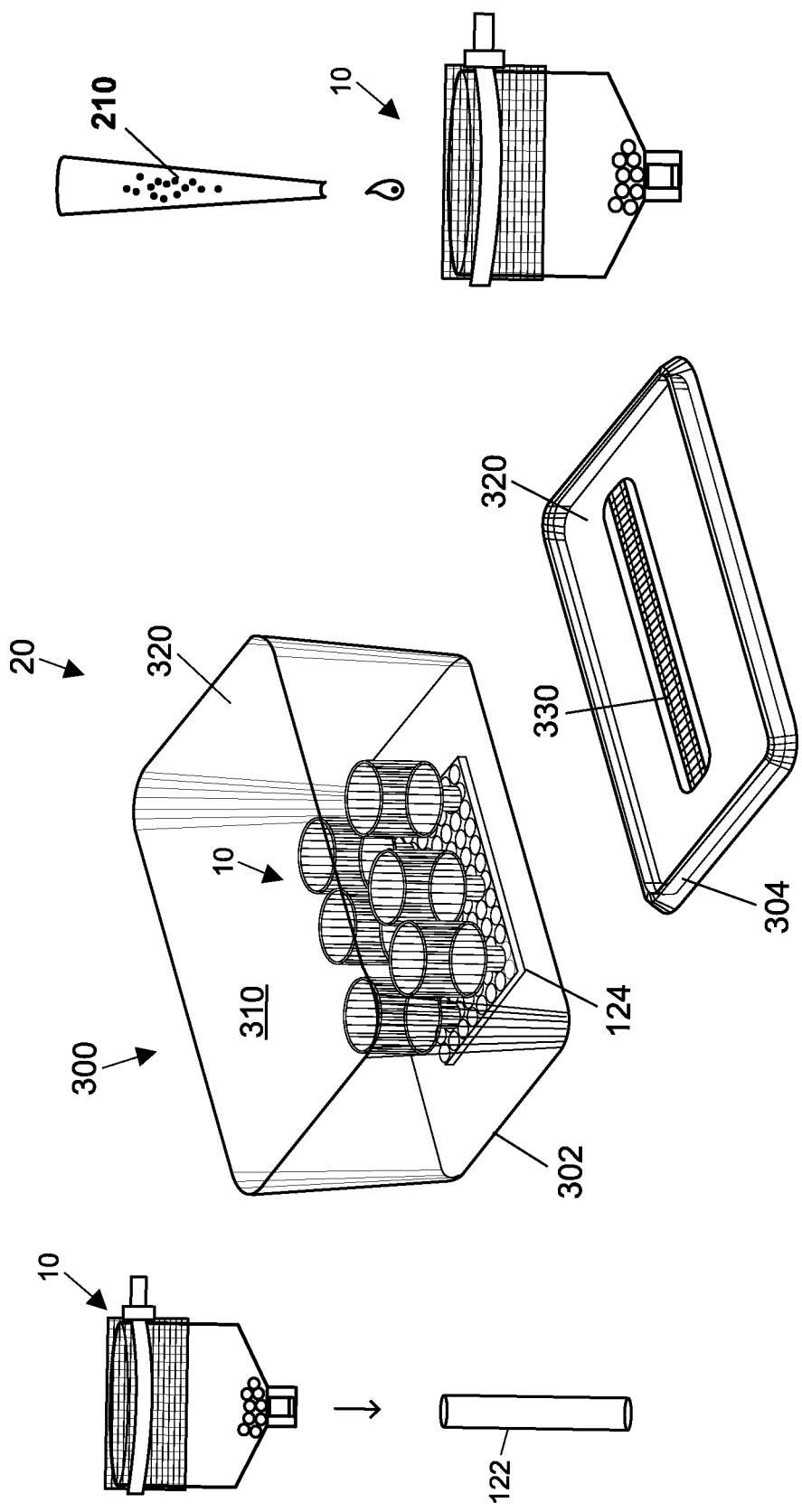
FIG. 4 illustrates sowing of seeds in a plant growth apparatus for subsequent growth in a plant growth system according to the disclosure.
Figure 5:
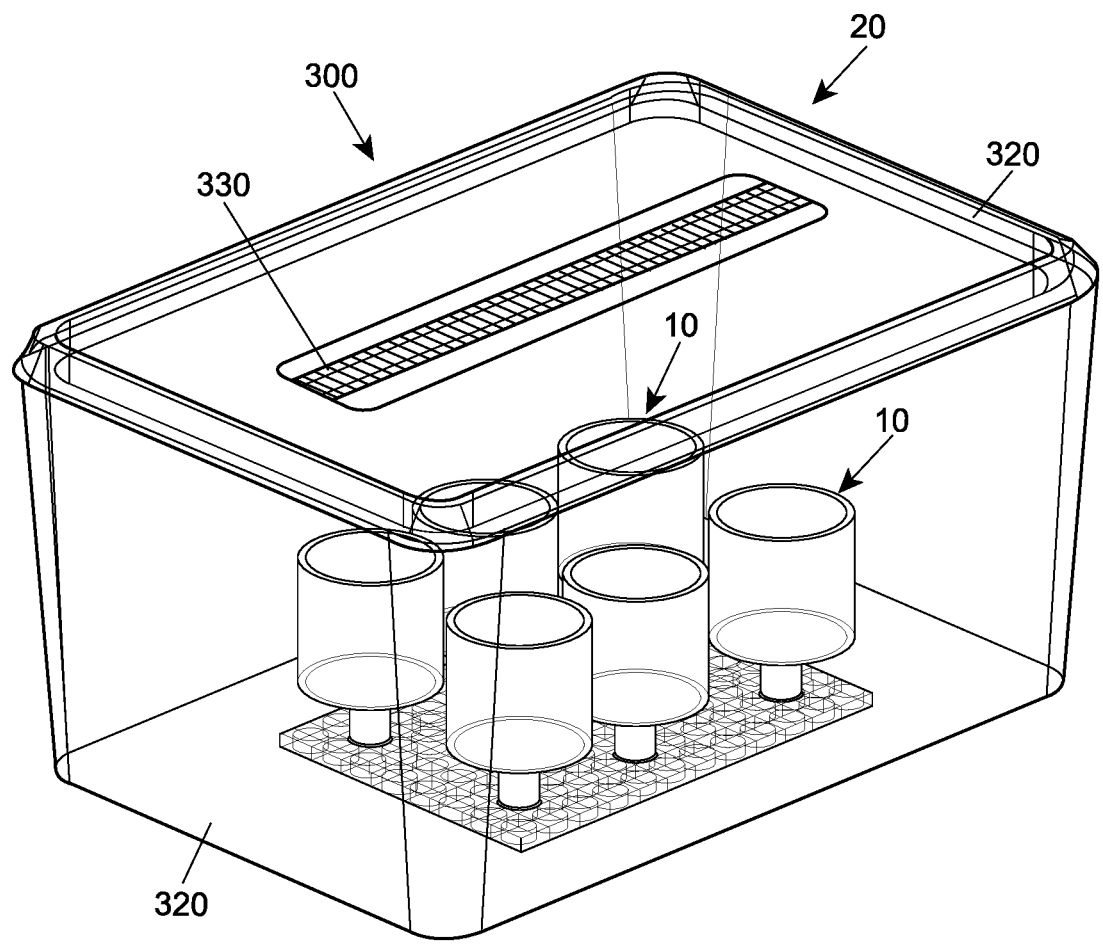
FIG. 5 illustrates an assembled plant growth system according to the disclosure.
Figure 6:
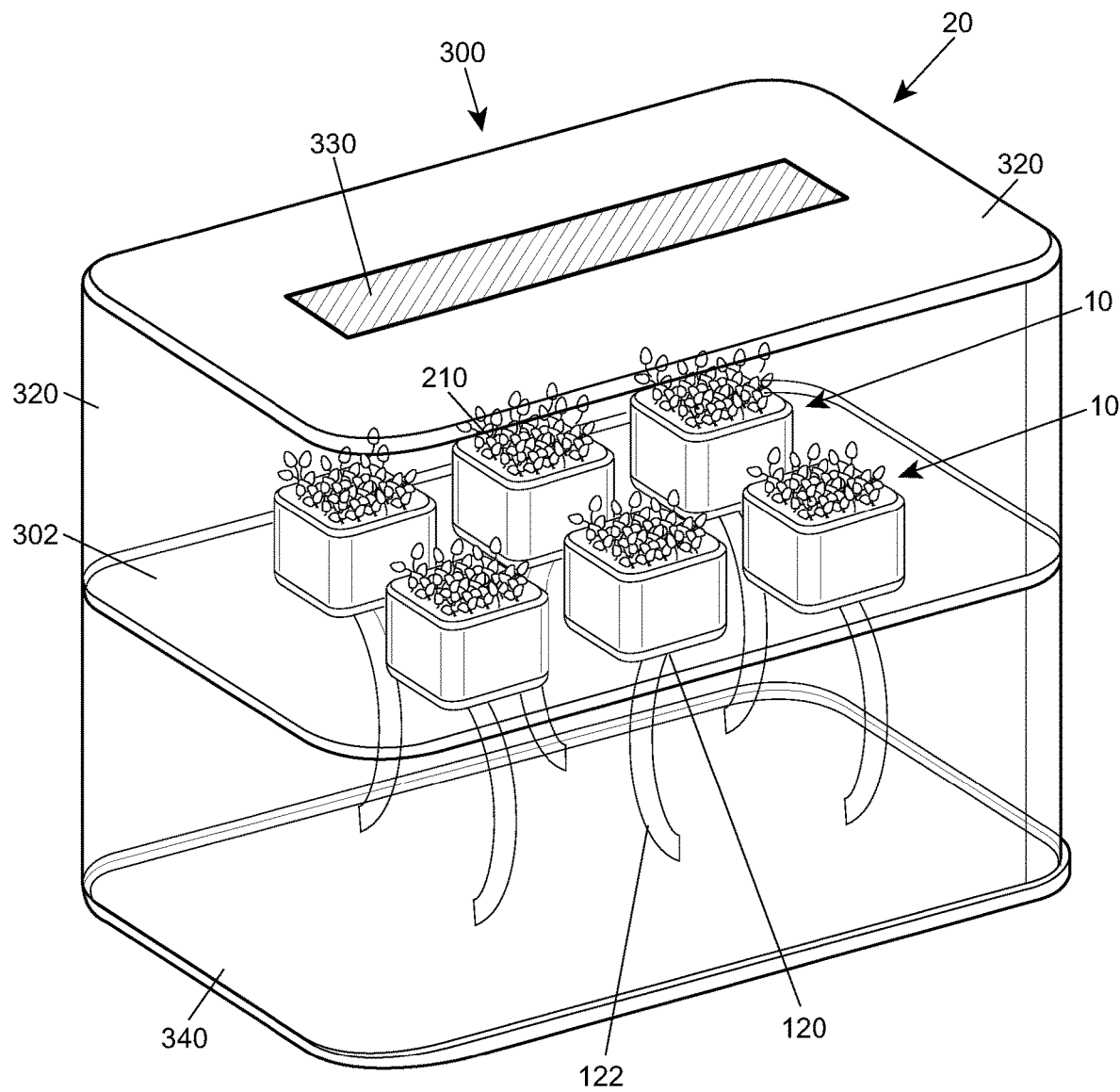
FIG. 6 illustrates an assembled plant growth system according to an alternative embodiment of the disclosure.

With specific reference to FIGS. 4-6, the plant growth system 20 includes the plant growth apparatus 10 according to any of its variously disclosed embodiments and/or refinements as well as a hermetically sealable container 300, which contains one or more of the apparatus 10 and is in a sealed state during plant growth. The container 300 generally includes an internal volume 310 and has a translucent external surface 320 as well as a microfilter 330 as an external surface (or component thereof) of the container 300. As illustrated, the container can include a bottom portion 302, a top portion 304, and a stand 124 positioned or mounted therein (e.g., at the bottom of the container) for stably holding the apparatus 10 in the container 300. The microfilter 330 is gas-permeable (e.g., allowing influx and outflux of metabolic gases and other environmental gases during plant growth) and microbe-impermeable (e.g., maintaining the initially selected biotic conditions for plant growth). The translucent external surface 320 can be an optically transparent or translucent surface capable of transmitting light therethrough, for example light wavelengths that stimulate plant growth such as UV/visible/IR ranges. Suitably, the container 300 is formed from a transparent polymeric material such as those noted above (e.g., polycarbonate or polypropylene), in particular those which are also autoclave-save. In some embodiments, essentially the entire body of the container 300 is formed from a translucent material (e.g., the entire body other than the microfilter 330). The apparatus 10 is positioned within the container 300 internal volume 310 such that the apparatus 10 fluid outlet 130 is in (gaseous) fluid communication with the microfilter 330 (e.g., allowing gas transfer from outside the container 300 into the growth chamber 100 interior volume 110), and at least a portion of the growth chamber 100 interior volume 110 is in optical communication with the container 300 translucent external surface 320 (e.g., allowing light from outside the container 300 to pass into the growth chamber 100 interior volume 110). The container 300 can be sized to hold any desired number of apparatus 10 units, for example at least 2, 3, 4, 6, or 10 and/or up to 4, 5, 6, 8, 10, 15, or 20 units.

An example of a suitable container 300 including a microfilter 330 for use according to the disclosure is the ECO2 MICROBOX container available from Combiness USA, New York or Combiness, Nevele, Belgium, for example model TPD1600 with an XXL filter as the microfilter 330, although any suitable commercially available container may be used and fitted with any desired gas-permeable, microbe-impermeable microfilter as desired. The microfilter 330 includes an array or strip of fibers (e.g., randomly aligned fibers), which can ensure that microorganisms are trapped (i.e., unable to leave from the interior or enter from the exterior) while permitting gas flow therethrough. An advantage of the strip depth filter from the MICROBOX is that that the gas exchange rate is known and that the microfilter 330 is passive (i.e., no external air pressure is necessary for gas species to pass through the microfilter 330). The microfilter 330 is preferably formed from hydrophobic materials (e.g., as in the MICROBOX) so that it does not become saturated with water. The strip depth filter is suitably used instead of a monolayer membrane filter because it can provide an improved restriction to microbial transmission.

Even though the plant growth apparatus 10 is typically treated with any desired rinse fluids, nutrient media, and/or inoculating media prior to use and initial placement into the container 300, in can be desirable in some cases to subsequently supplement the growth chamber 100/plant growth substrate 200 with one or more additional rinse fluids, nutrient media, and/or inoculating media after some period of growth in the sealed container 300. The system 20 and container 300 illustrated in FIGS. 5 and 6 are conducive such supplemental treatment, with the container 300 being easily opened so that individual apparatus 10 can be removed aseptically as desired, for example sterile tongs. Once the apparatus 10 are removed, they can be irrigated with any desired fluids, for example using the syringe 410 via the fluid inlet 120 (e.g., luer inlet with male-male coupling or small segment of siliconized tubing 122). Once removed, the apparatus 10 can also be dipped in aqueous solutions/suspensions (i.e. suspensions of bacteria or particular chemicals), as well as vacuum infiltrated using a vacuum chamber. After any desired supplemental treatments, the apparatus 10 are then returned to the environment container 300 for further plant growth under the desired biotic conditions.

In an embodiment of the system 20 and container 300 illustrated in FIG. 6, an inoculation container chamber 340 is fused to the plant growth environment container 300 (e.g., at the base of the container bottom 302 as illustrated) and a segment of the inlet tube 122 connected to the fluid inlet 120 spans the two containers 300, 340 (e.g., through holes in the base of the container bottom 302), thus allowing inoculation/irrigation with any desired fluid(s) from the bottom without the risking contamination derived from opening the plant growth environment container 300. In many cases, however, is sufficient to inoculate with water/nutrients a single time prior to initial placement into the sealed container 300 for the lifespan of the plant. Moreover, as described above, it is possible to open the container sealed container 300 embodiment of FIG. 5 in a manner that allows subsequent treatment while maintaining the desired controlled biotic conditions.

With specific reference to FIGS. 3-7, the plant growth apparatus 10 and plant growth system 20 according to any of their variously disclosed embodiments and/or refinements can be used in a method for growing plants. Generally, the plant growth substrate 200 (which can be sterilized from an earlier sterilization or autoclaving step) is prepared for plant growth by (1) feeding sterilized water 420 into the fluid inlet 120 and through the plant growth substrate 200, thereby forming a flush eluent 422 exiting from the fluid outlet 130, (2) feeding a liquid plant nutrient medium 430 into the fluid inlet 120 and through the plant growth substrate 200, thereby forming a nutrient eluent 432 exiting from the fluid outlet 130, and optionally (3) feeding a liquid inoculant 440 into the fluid inlet 120 and through the plant growth substrate 200, thereby forming an inoculant eluent 442 exiting from the fluid outlet 130. In some embodiments, no liquid inoculant 440 is fed through the plant growth substrate 200, such as when no microbial community (known or unknown) is desired in the plant growth apparatus 10 (e.g., where the substrate 200 is sterilized), or when the seeds to be subsequently planted are pre-inoculated with a known or unknown microbial community. In some embodiments, the liquid plant nutrient medium 430 and the liquid inoculant 440 are in the form of a mixture fed together into the fluid inlet 120. In other embodiments, the liquid plant nutrient medium 430 and the liquid inoculant 440 are separate mixtures fed individually the fluid inlet 120. The method further includes sowing one or more plant seeds 210 into the plant growth substrate 200. In some embodiments, the seeds 210 are sown after the substrate 200 has been rinsed and conditioned with nutrients and/or inoculants. In other embodiments, the seeds 210 are sown before the substrate 200 has been rinsed and conditioned with nutrients and/or inoculants. After conditioning of the substrate 200 and sowing of the seeds 210, the plant growth apparatus 10 is sealed in the hermetically sealable container 300, and the corresponding plant is then grown in the container while preventing any microbial material from entering the sealed container 300 during growth. During growth of the plant, environmental growth conditions can be controlled by exposing the container 300 to a light source (e.g., artificial and/or natural) and/or controlling the environmental temperature of the container 300 according to appropriate conditions generally known in the art for the specific plant being grown.

Sterilization (e.g., by heat treatment such as autoclaving or otherwise) of the plant growth substrate 200 can change the physical and/or chemical properties of the substrate in a manner that generates water-soluble plant growth toxins and/or makes existing water-soluble plant growth toxins more accessible. For example, sterilization can chemically degrade or otherwise release organic and/or inorganic substrate 200 components that are water-soluble (e.g., amenable to leaching by water) toxins that interfere with plant growth. Similarly, sterilization can change the surface area characteristics of the substrate 200 in some cases to make water-soluble plant toxins (e.g., as originally present and/or as generated by the sterilization process) more accessible to solubilization into a subsequently added water phase (e.g., a liquid microorganism inoculant and/or a liquid nutrient medium). The feeding of the sterilized water 420 to form the corresponding flush eluent 422 can remove or at least substantially reduce the presence of such water-soluble plant toxins prior to subsequent plant growth (e.g., reduction or removal of toxins to an undetectable level, reduction of toxins to a level that does not inhibit subsequent plant growth).

The materials and solutions used as the nutrient medium 430 and the liquid inoculant 440 are not particularly limited and can generally include any such suitable materials known in the art for plant growth. In an embodiment, the liquid plant nutrient medium 430 can include Murashige and Skoog (MS) medium (e.g., ½× MS medium with pH 5.7). In another embodiment, the liquid plant nutrient medium 430 can include Hoagland medium (e.g., ½× Hoagland medium, such as including various iron chelates). In an embodiment, the liquid inoculant 440 includes an aqueous extract from a known soil source community. In another embodiment, the liquid inoculant 440 includes known microorganisms from a known culture medium (e.g., known in terms of particular species and/or distribution among the different species). For example, the liquid inoculant 440 can include one or more known types of microorganisms, and subsequent growth of the plant is gnotobiotic growth. In an alternative embodiment, the liquid inoculant 440 is sterilized (e.g., free or substantially free from live, active, viable, etc. microorganisms and viruses), and subsequent growth the plant is axenic growth (e.g., but possibly including soluble nutrients leached from the source soil when the inoculant is originally formed).

Figure 7:
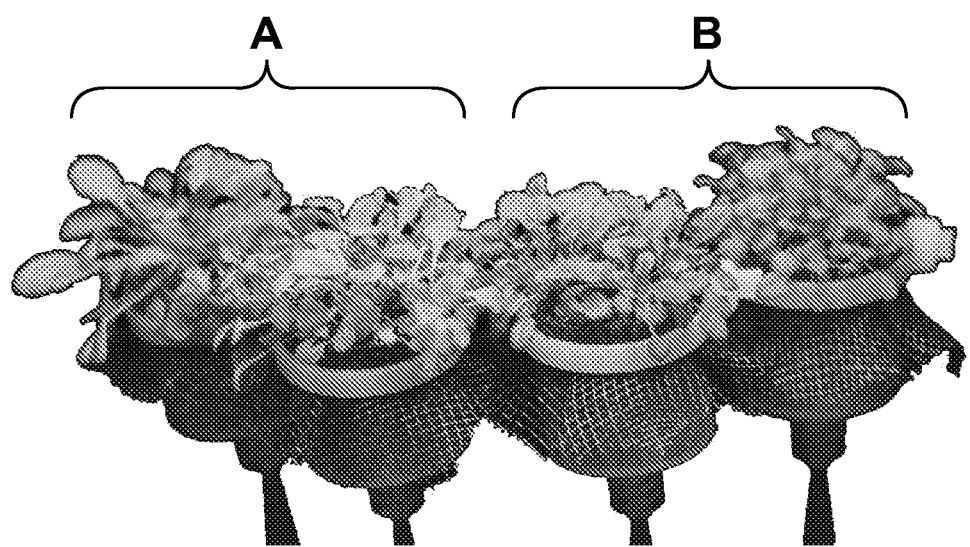
FIG. 7 includes photographs of *Arabidopsis thaliana* plants grown under holoxenic (A) and axenic (B) growth conditions in a plant growth apparatus ("FLOWPOT") and system according to the disclosure.

FIG. 7 includes photographs of *Arabidopsis thaliana* plants grown under axenic and holoxenic growth conditions in a plant growth apparatus 10 and system 20 according to the disclosure. The plant growth substrate 200 was 1:1 peat:vermiculite mixture as generally described in the examples below, and the substrate 200 was irrigated with a ½× MS nutrient medium. The holoxenic plant was inoculated with a complex, soil-derived microbial community collected from a *Miscanthus* plot on the campus of Michigan State University in East Lansing, Mich. The corresponding axenic plant was inoculated with a heat-attenuated microbial community derived from the same *Miscanthus* plot. The images are shown at about 3 weeks post germination, and phenotypic differences are evident between the resulting axenic- and holoxenic-growth plants. Selection of a desired inoculation medium 440 to provide corresponding axenic, gnotobiotic, or holoxenic growth conditions as well as a desired nutrient medium 430 and substrate 200 can be used to determine the effects of varying the same on the resulting plant phenotypic characteristics of interest.

EXAMPLES

The following examples illustrate the disclosed apparatus, systems, and methods for gnotobiotic plant growth, but they are not intended to limit the scope thereof.

Example 1

This example illustrates the construction and operation of an axenic, gnotobiotic, or holoxenic plant growth apparatus and system that utilizes sterile peat substrate and bottom-flow irrigation. The plant growth system permits inoculation of a soil substrate or plants with nutrients and/or microorganisms, including pure cultures and complex soil communities. This permits analysis of microbiome establishment, persistence, and host phenotypes within the growth system.

The presence of endogenous microbiota on and inside plants is hypothesized to influence many phenotypic attributes of the host. Likewise, host factors and microbe-microbe interactions are believed to influence endogenous microbiome establishment and species composition. Rigorous testing of these hypotheses requires growing plants in the absence or presence of the endogenous microbiota. This example illustrates a sterile peat-based plant growth system to grow axenic (microbe-free), gnotobiotic (defined microbiota), and holoxenic (complex, or undefined microbiota) plants. This plant growth system enables users to control abiotic factors to allow for detection of microbiota-influenced host phenotypes and identification of factors that contribute to shifts in microbiome composition and/or function. Bottom-flow irrigation (e.g., through the fluid inlet port 120 as shown in the figures) allows for homogeneous inoculations and subsequent drainage, and a mesh retainer (e.g., the fluid outlet 130 as shown in the figures) allows individual growth vessels to be inverted, enabling dip and infiltration assays. This example illustrates the utility of the disclosed plant growth system to screen for microbiome-induced protection in *Arabidopsis* against *Pseudomonas syringae* pv. tomato DC3000.

In an 1885 address to the French Academy of Sciences, Louis Pasteur expressed doubts that animals were capable of survival without microbiota. Pasteur went on to credit the work of Duclaux and his experiments with axenic and inoculated peas to study the phenomenon of nitrogen fixation by microorganisms. At least in part, Pasteur's address catalyzed the emergence of a new field—gnotobiology. Animal researchers were not far behind the plant researchers, and systems to raise axenic mice, chickens and rats were established before the first half of the 20th century. Seminal studies with axenic animal models demonstrate that enteric microbiota is essential for proper nutrition, physiology, cardiovascular function, and immune function. Axenic plant models reveal that microbiota can contribute to increased biomass, root exudation, and pathogen resistance. Two major motivations for establishing gnotobiotic (defined microbiota) or axenic (microbe-free) systems are: 1) to elucidate the functional impact of microbiota on host phenotype and 2) to identify factors that influence microbiome structure and function. An axenic growth system suitably will minimize artifacts and maximize uniformity, but not at the expense of versatility and the ability to address specific biological questions. Secondary considerations include cost and ease of use.

The simplest axenic systems for plant growth are agar or gelling-agent based. While appropriate for some applications, agar or equivalent gelling agents do not provide a soil-like scaffold for microbial colonization and root growth, thereby limiting its utility as a gnotobiotic system. Limited porosity in gelling agents constrains gas and nutrient exchange to Fick's Law of Diffusion, potentially resulting in root anoxia and ethylene accumulation. Hydroponic systems can alleviate the uniformity of nutrient and $O_2$-delivery by aeration and media replenishment, or by supplying plants with water and nutrients by capillary action. However, hydroponic systems also do not provide a soil-like scaffold for microbial colonization and common-reservoir hydroponic systems can be challenging to maintain axenic conditions and prevent cross-contamination.

Non-soil substrates such as sand, quartz, vermiculite and calcined clay are frequently used in gnotobiotic systems. These substrates are porous, thus providing surface area for microbial colonization and root penetration. However, batch-to-batch variation of ceramic substrates can result in a wide range of labile ions. Calcined clay, for example, has sorptive properties that can result in reduced labile concentrations of P, Fe, Cu, and Zn, and desorptive properties that can result in excess labile B, Mg, Ca, S, K, and sometimes to toxic levels, Mn. While thorough washing or soaking of the non-soil substrate can reduce the initial excess of labile ions, flow and drainage are important to reduce significant changes in chemistry over time. It is also worth noting that unlike soil, the aforementioned non-soil substrates lack significant organic carbon unless supplemented.

Soil has also been used as substrate in axenic systems. Several sterilization methods exist. Autoclaving soil has been shown to increase levels of water-soluble carbon and reduce pH, but not significantly alter ion exchange capacity. Gamma-irradiation has been reported to minimally disrupt the physical nature of certain soils, but can result in the generation of reactive oxygen species, capable of depolymerizing C—C of polysaccharides. Both autoclaving and gamma irradiation can result in changes of the physical structure of the soil, exposing more surface area and thus altering sorptive properties. Notably, there are also reports of soil retaining enzymatic activity after sterilization. All methods of soil sterilization alter, to some extent, physical and chemical properties. Therefore, sterilization of soil followed by introduction of microbiota is recommended, even if the goal is to examine the functional impact of indigenous microbiota. Complete sterilization by autoclaving can be achieved with minimal physiochemical changes by multiple short (<45 minutes) autoclave cycles.

This example illustrates a method for constructing and using a versatile axenic, gnotobiotic, or holoxenic plant growth system according to the disclosure and using standard laboratory equipment. The example is illustrative and is not intended to limit the disclosed apparatus, system, or methods. A unique aspect of the disclosure is that each individual plant growth apparatus (vessel) in the system has a port (e.g., the fluid inlet port 120 as illustrated in the figures) that allows for flushing of the substrate to remove soluble byproducts of sterilization, drainage, and homogenous inoculation with microbiota and/or nutrients. This feature greatly improves plant growth in the absence of microbiota. For added versatility, a mesh retainer (e.g., the fluid outlet 130 as illustrated in the figures) allows the plant growth apparatus to be inverted for a variety of downstream applications, including dip or infiltration experiments.

Plant Growth Apparatus and System Component Construction.

Using a mitre saw with a fine-tooth blade, cut 50 ml polypropylene (PP) luer taper syringes (available from KDScientific, Holliston, Mass.) at the "15 ml" mark, retaining only the bottom portion as the growth chamber 100 with the luer connector as the fluid inlet 120. Mount the blade on the mitre saw backwards for a smoother cut. Discard the piston and remove any residual shards with a vacuum and a moist cloth. Soak the syringe tops for 20 minutes in 2% (v/v) HARLECO MULTI-TERGE ionic detergent (low-foaming phosphate-free liquid detergent; available from EMD Millipore/VWR Scientific, Radnor, Pa.), and subsequently rinse the syringe tops in distilled water to remove all traces of the detergent. Autoclave the growth chamber 100 prior to assembly of the plant growth apparatus.

Cut 5 cm×5 cm squares of mesh fiberglass (18×14 standard charcoal color mesh; available from Phifer Incorporated, Tuscaloosa, Ala.) as the fluid outlet 130 to be attached to the growth chamber 100. Autoclave the fluid outlet 130 prior to assembly of the plant growth apparatus.

Cut silicone tubing (Pt-cured silicone tubing available from Cole-Parmer Instrument Company, Vernon Hills, Ill.) in 5 cm segments as inlet tube 122 to be attached to the fluid inlet 120. Place the tubing segments in a pipette tip box and autoclave prior to assembly of the plant growth apparatus. In an alternative embodiment, the tubing segments can be replaced with another suitable luer connector, for example a female-female luer connector (e.g., part number EW-45502-22 or equivalent, also available from Cole-Parmer Instrument Company) that can connect to a male luer connector as the fluid inlet 120 and to a male luer connector of the syringe 410 for delivering the various rinse, nutrient, and inoculating fluids to the plant growth apparatus.

Rinse 3 mm soda-glass beads (available from Sigma-Aldrich, St. Louis, Mo.) as the solid retaining means 220 six times with distilled water. Dry and autoclave the solid retaining means 220 prior to assembly of the plant growth apparatus.

Drill six holes in a 12 cm×8 cm×1 cm block of autoclave-compatible plastic (e.g., polypropylene or polycarbonate) using an 8.8 mm drill bit to create the stand 124 for the plant growth apparatus.

Center and fasten the drilled stand 124 to the inside bottom of each ECO2 MICROBOX (model TPD1600 with XXL filter as the microfilter 330; available from Combiness USA, New York or Combiness, Nevele, Belgium) as the hermetically sealable container 300 including a bottom 302 and top 304 using a suitable adhesive tape (e.g., Scotch brand model 893 18 mm filament tape; available from 3M, Maplewood, Minn.). Autoclave the constructed containers 300 (e.g., including the bottom 302, top 304 with integrated filter 300, and stand 124) and lids prior to use. To prevent container 300 deformation, the lid or top 304 is preferably not fully sealed prior to autoclaving.

Substrate Sterilization.

Blend a 1:1 ratio of peat potting mix (e.g., peat-based Sunshine Mix LG3; available from Sun Gro Horticulture, Canada) and medium vermiculite as the plant growth substrate 200. Moisten with distilled water to achieve moisture content of approximately 60%. Evenly distribute the substrate on clean polypropylene laboratory trays (available from United Scientific Supplies, Waukegan, Ill.) at a depth of approximately 2 cm. Cover the surface of each tray with aluminum foil or autoclave paper in such a way that liquid will not collect on top during autoclaving and flow onto the substrate. Autoclave for 30 minutes on liquid cycle (121.1° C., 15 psi, slow exhaust with forced liquid cooling) and bring to room temperature immediately after autoclaving.

Homogenize the plant growth substrate 200 in a sterile container and subsequently distribute on the polypropylene laboratory trays. Let sit covered at room temperature (e.g., 22° C. to 25° C.) for 24 to 48 hours.

Autoclave the plant growth substrate 200 again for 30 minutes on liquid cycle (121.1° C., 15 psi, slow exhaust with forced liquid cooling) and bring to room temperature immediately after autoclaving. Pre-clean the surface of a laminar flow hood using SPORE-KLENZ liquid cold sterilant/disinfectant (STERIS, Mentor, Ohio). Homogenize under sterile laminar flow and leave covered at room temperature (e.g., 22° C. to 25° C.) for 24 to 48 hours. The foregoing autoclaving procedures are suitable for the indicated 1:1 peat:vermiculite substrate mixture, but for alternative substrates with different initial moisture contents, relative humidity, and autoclave calibration, different suitable autoclave parameters can be selected according to general knowledge in the art.

Plant Growth Apparatus Component Assembly.

FIG. 2 illustrates steps in assembling the plant growth apparatus 10. Aseptically place 10 glass beads as the solid retaining means 220 into each of the 15 mL syringe tips as the growth chamber 100. Use a sterile test tube rack to stabilize the syringe tips during this process. Fill the syringe tip with the twice-autoclaved substrate mixture 200 until slightly heaping. Cover the cut end (i.e., opposite the luer inlet end as the fluid inlet 120) of the syringe with the square mesh as the fluid outlet 130 and secure with a cable tie (available from TENAX Corporation, Baltimore, Md.). Trim the edges of the square mesh. Attach the 5 cm silicone tubing segments as the inlet tube 122 on the luer end of the syringe tips and place on a test tube rack to complete the plant growth apparatus 10 construction. Once the test tube rack is full, place in a transparent, autoclavable sun bag (model B7026; available from Sigma-Aldrich, St. Louis, Mo.) and loosely close the end with autoclave tape so that steam can still infiltrate the bag during sterilization. Autoclave for 45 minutes on liquid cycle (121.1° C., 15 psi, slow exhaust with forced liquid cooling). Immediately after autoclaving, seal the opening of the sun bag and move to a sterile hood.

Source Community Preparation.

To prepare a soil source microbiota community, remove topsoil and collect soil more than 6 cm below the surface of a desired soil source. Let soil sit for one week at room temperature at about 50% relative humidity, and sift through a 1 $mm^2$ screen to remove large debris. Aliquot soil in 100 g increments and store at 4° C. in plastic WHIRL-PAK bags (available from Nasco, Atkinson, Wis.).

Prepare a 1× concentrate of Murashige and Skoog (MS) medium with Gamborg's vitamins (pH 5.7, 0.5 g/L MES; available from Caisson Laboratories, Logan, Utah).

Add 950 mL of sterile distilled water and 50 g of the sifted source soil to a sterile 2 L Erlenmeyer flask. Agitate soil slurry on a rotary shaker for 20 minutes at 22° C., and subsequently let settle for 5 minutes.

Filter the supernatant through a 40 µm cell strainer (FALCON model #352340; available from Thermo Fisher Scientific, Waltham, Mass.) into a sterile Nalgene media bottle. A 1:1 mixture of the filtered soil slurry to the 1× MS solution is the working concentration of the source inoculant, bringing the final concentration of MS to ½×.

To prepare a sterile inoculum, autoclave a portion of the filtered supernatant for 45 minutes on liquid cycle (121.1°

C., 15 psi, slow exhaust with forced liquid cooling) prior to mixing 1:1 with the 1× MS solution.

In a sterile hood, remove the rack of sterilized/autoclaved plant growth assemblies 10 from the sun bag 126. Gloves and the surface of the hood are suitably cleaned using the SPORE-KLENZ liquid cold sterilant/disinfectant according to manufacturer's instructions. Using a sterile test tube clamp, grasp each plant growth apparatus 10 and invert over a sterile funnel placed atop a waste flask. While inverted, use a 50 ml syringe 410 to slowly infiltrate each apparatus 10 via the silicon tubing 122 attached to both the syringe 410 and the fluid inlet 120. Apply even pressure for 30 seconds during infiltration with sterilized water 420 to form and collect a flush eluent 422 in the waste flask. After water infiltration, place the apparatus 10 on a sterile test tube rack. To reduce the risk of contamination, the test tube clamps are suitably ethanol-flamed between each apparatus 10 infiltration. Occasionally, it is desirable to clear the infiltration port with a sterile syringe needle.

Let the water-infiltrated plant growth apparatus 10 sit for 30 minutes. Subsequently, using the same procedure as above with the sterilized water 420, infiltrate each apparatus 10 with the desired input community mixture, for example the combined liquid inoculant 440 (e.g., with the soil source community or sterilized) and liquid plant nutrient 430 (e.g., the MS solution) as above, thereby forming and collecting a combined inoculant eluent 442 and nutrient eluent 432 in the waste flask. Evenly mix the input community prior to infiltration. As an alternative to a soil source community, one can use defined communities of microorganisms derived from pure cultures. For bacteria, a suitable combined liquid inoculant 440/liquid plant nutrient 430 can include $10^6$ CFU/ml bacteria suspended in a ½× MS solution.

Using the test tube clamp or sterile tongs, place the inoculated plant growth assemblies 10 in the drilled holes of the stand 124 within the sterilized/autoclaved microbox as the container 300, for example with 4, 5, or 6 assemblies 10 per microbox.

Sowing Seeds, Growth, and Thinning.

Sterilize seeds using the vapor-phase sterilization protocol according to Clough and Bent (1998). Sterile seed aliquots are opened in a laminar flow hood for at least 10 minutes after sterilization to adequately remove residual chlorine gas. Check for seed-borne contaminants and germination efficiency by incubating an aliquot of seeds on R2A agar (e.g., available from Thermo Fisher Scientific, Waltham, Mass.) for one week at 22° C. in the dark.

Allow seeds to imbibe during a 48-hour stratification in sterile distilled water at 4° C. in the dark.

Sow eight seeds per plant growth apparatus 10 using a pipette with filter tips.

After sowing, make sure the microbox container 300 lids are completely sealed to maintain consistent humidity and sterility. For *Arabidopsis thaliana* Col-0, suitable growth conditions include 23° C. with 12/12 lights at an intensity of about 80 µE $m^{-2}s^{-1}$. Suitable growth conditions for other plants can be suitably selected according to knowledge in the art.

Aseptically thin the microbox container 300 to three plants per plant growth apparatus 10 using flamed forceps 7-10 days after germination. For a sterility check, place the thinned plants on R2A agar and incubate for 7 days.

Example Application: *Pseudomonas syringae* pv. tomato DC3000 Disease Assay.

This illustrative disease assay is a variation of the vacuum infiltration method of Katagiri et al. (2002). Prepare a suspension of *Pseudomonas syringae* pv. tomato DC3000 (Pst) according to Katigiri et al. (2002) in 1 mM $MgCl_2$ with 0.0025% SILWET L-77 surfactant (3-(2-methoxyethoxy)propyl-methyl-bis(trimethylsilyloxy)silane), for example at a suitable concentration of $10^5$ CFU/ml as prepared herein.

Distribute the Pst suspension into 100 mL pyrex glass beakers (one per plant growth apparatus 10). Use a large binder clip glass to clamp the bottom of the apparatus 10 luer lock fluid inlet 120. The binder clamp suspends the apparatus 10 in the liquid Pst suspension.

Place suspended plant growth assemblies 10 in a vacuum desiccator placed in a sterile hood. Apply vacuum until pressure reaches a level of approximately 520 mm Hg. Maintain this pressure for 1 minute. Subsequently, slowly release the vacuum over a period of 10 seconds. Repeat this procedure and remove the assemblies 10 from the bacterial Pst suspension.

Let the combined plant growth apparatus 10/clamp complex rest on its side on a sterile surface in a laminar flow hood for 10 minutes to let most surface liquid fall off.

Fasten sterile MIRACLOTH (autoclavable, quick filtration material composed of rayon-polyester with an acrylic binder; available from EMD Millipore/VWR Scientific, Radnor, Pa.) to the surface of the microbox container 300 using the lip of a microbox lid container, and place under sterile laminar flow for four hours or until leaves no longer have a glassy appearance.

Replace the MIRACLOTH lid with the microfilter 330 lid 304 and return the microbox container 300 to a growth chamber.

At approximately 72 hours post infiltration, collect infected leaves and cut at the petiole. Grind in leaf discs in sterile 1 mM $MgCl_2$ and perform a serial dilution according to Katagiri et al. (2002) to determine $CFU/cm^2$.

Summary. Despite the fact that plants grow in association with thousands of species of microorganisms, beyond a handful of well-characterized model organisms, very little is known about the functional dynamics of plant-microbiome interactions. The plant growth apparatus and system described herein allows users to inoculate a sterile soil substrate with a known or otherwise pre-selected microbial community of choice and analyze resultant host phenotypic characteristics. Subtle effects of introducing individual microorganisms to pre-established microbial communities can be studied, as well as biocontrol assays.

Because other modifications and changes varied to fit particular operating requirements and environments will be apparent to those skilled in the art, the disclosure is not considered limited to the example chosen for purposes of illustration, and covers all changes and modifications which do not constitute departures from the true spirit and scope of this disclosure.

Accordingly, the foregoing description is given for clearness of understanding only, and no unnecessary limitations should be understood therefrom, as modifications within the scope of the disclosure may be apparent to those having ordinary skill in the art.

All patents, patent applications, government publications, government regulations, and literature references cited in this specification are hereby incorporated herein by reference in their entirety. In case of conflict, the present description, including definitions, will control.

Throughout the specification, where the apparatus, systems, compounds, compositions, methods, and processes are described as including components, steps, or materials, it is contemplated that the compositions, processes, or apparatus can also comprise, consist essentially of, or consist of, any combination of the recited components or materials, unless described otherwise. Component concentrations can be expressed in terms of weight concentrations, unless specifically indicated otherwise. Combinations of components are contemplated to include homogeneous and/or heterogeneous mixtures, as would be understood by a person of ordinary skill in the art in view of the foregoing disclosure.

PARTS LIST 10 plant growth apparatus
20 plant growth system
100 growth chamber
110 internal volume
120 fluid inlet (e.g., luer port)
122 inlet tube
124 stand
126 sun bag
130 fluid outlet (e.g., perforated screen)
200 plant growth substrate
210 plant, seedling, or seed
220 solid retaining means (e.g., beads)
300 hermetically sealable container
302 container bottom
304 container top or lid
310 internal volume
320 translucent external surface
330 microfilter
340 inoculation chamber
410 syringe
420 sterilized water
422 flush eluent
430 liquid plant nutrient medium
432 nutrient eluent
440 liquid inoculant
442 inoculant eluent

REFERENCES

1. Abrams, G. D., Bauer, H., Sprinz, H. Influence of the normal flora on mucosal morphology and cellular renewal in the ileum. A comparison of germ-free and conventional mice. Lab Invest. 12, 355-364, (1963).
2. Adams, C., Jacobson, A., Bugbee, B. Ceramic Aggregate Sorption and Desorption Chemistry: Implications for Use as a Component of Soilless Media. J Plant Nutr, 37, 1345-1357, doi:10.1080/01904167.2013.837921, (2014).
3. Berns, A. E., Philipp, H., Narres, H. D., Burauel, P., Vereecken, H., Tappe, W. Effect of gamma-sterilization and autoclaving on soil organic matter structure as studied by solid state NMR, UV and fluorescence spectroscopy. Eur J Soil Sci. 59 (3), 540-550, doi:10.1111/j.1365-2389.2008.01016.x, (2008).
4. Blankinship, J. C., Becerra, C. A., Schaeffer, S. M., Schimel, J. P. Separating cellular metabolism from exoenzyme activity in soil organic matter decomposition. Soil Biol Biochem. 71, 68-75, doi:10.1016/j.soilbio.2014.01.010, (2014).
5. Buchan, D., Moeskops, B., Ameloot, N., De Neve, S., Sleutel, S. Selective sterilisation of undisturbed soil cores by gamma irradiation: effects on free-living nematodes, microbial community and nitrogen dynamics. Soil Biol Biochem. 47, 10-13, doi:10.1016/j.soilbio.2011.12.014, (2012).
6. Clough, S. J., Bent, A. F. Floral dip: a simplified method for *Agrobacterium*-mediated transformation of *Arabidopsis thaliana*. Plant J. 16 (6), 735-743, doi:10.1046/j.1365-313x.1998.00343.x, (1998).
7. Gordon, H. A., Pesti, L. The gnotobiotic animal as a tool in the study of host microbial relationships. Bacteriol Rev. 35 (4), 390-429, (1971).
8. Gunning, T., Cahill, D. M. A Soil-free Plant Growth System to Facilitate Analysis of Plant Pathogen Interactions in Roots. J Phytopathol. 157 (7-8), 497-501, doi:10.1111/j.1439-0434.2008.01503.x, (2009).
9. Henry, A., Doucette, W., Norton, J., Jones, S., Chard, J., Bugbee, B. An axenic plant culture system for optimal growth in long-term studies. J Environ Qual. 35 (2), 590-598, doi:10.2134/jeq2005.0127, (2006).
10. Jackson M. B., Abbott A., Belcher A. R., Hall K. C., Butler, R., Cameron, J. Ventilation in plant tissue cultures and effects of poor aeration on ethylene and carbon dioxideaccumulation, oxygen depletion and explant development. Ann Bot-London. 67, 229-237, (1991).
11. Katagiri, F., Thilmony, R., He, S. Y. The *Arabidopsis thaliana-Pseudomonas syringae* interaction. The *Arabidopsis* book/American Society of Plant Biologists. 1, doi:10.1199/tab.0039, (2002).
12. Lebeis, S. L., et al. Salicylic acid modulates colonization of the root microbiome by specific bacterial taxa. Science. aaa8764, doi:10.1126/science.aaa8764, (2015).
13. Luckey, T. D. Nutrition and Biochemistry of Germfree Chicks. Ann NY Acad Sci. 78 (1), 127-165, (1959).
14. Luckey, T. D. Germfree life and gnotobiology. Elsevier-London. 34-40, 60-64, (1963).
15. Pasteur L. Observation relative à la note précédente de M. Duclaux. Compte Rendus de l'Académie des Sciences. 100, 68, (1885).
16. Puri, G., Barraclough, D. Comparison of 2450 MHz microwave radiation and chloroform fumigation-extraction to estimate soil microbial biomass nitrogen using 15N-labelling. Soil Biol Biochem. 25 (4), 521-522, doi:10.1016/0038-0717(93)90078-p, (1993).
17. Round, J. L., Mazmanian, S. K. The gut microbiota shapes intestinal immune responses during health and disease. Nat Rev Immunol. 9 (5), 313-323, doi:10.1038/nri2515, (2009).
18. Sahashi, N., Tsuji, H., Shishiyama, J. Barley plants grown under germ-free conditions have increased susceptibility to two powdery mildew fungi. Physiol Mol Plant P. 34 (2), 163-170, (1989).
19. Schroth, K. J. W. Plant Growth-Promoting Rhizobacteria and Plant Growth Under Gnotobiotic Conditions. Phytopathology. 71, 642-644, doi:10.1094/phyto-71-642, (1981).
20. Shaw, L. J., Beatonb, Y., Glover, L. A., Killham, K., Meharg, A. A. Re-inoculation of autoclaved soil as a non-sterile treatment for xenobiotic sorption and biodegradation studies. Appl Soil Ecol. 11 (2), 217-226, doi:10.1016/s0929-1393(98)00149-8, (1999).
21. Simons, M., Van Der Bij, A. J., Brand, I., de Weger, L. A., Wijffelman, C. A., Lugtenberg, B. J. J. Gnotobiotic System for Studying Rhizosphere Colonization by Plant Growth-Promoting *Pseudomonas* Bacteria. Mol Plant Microbe In. 9 (7), 600-607, doi:10.1094/mpmi-9-0600, (1996).
22. Urbanek, E., Bodi, M., Doerr, S. H., Shakesby, R. A. Influence of initial water content on the wettability of autoclaved soils. Soil Sci Soc Am J. 74 (6), 2086-2088, doi:10.2136/sssaj2010.0164n, (2010).
23. Wagner, M. R., Lundberg, D. S., Coleman-Derr, D., Tringe, S. G., Dangl, J. L., Mitchell-Olds, T. Natural soil microbes alter flowering phenology and the intensity of selection on flowering time in a wild *Arabidopsis* relative. Ecol Lett. 17 (6), doi:10.1111/ele.12276, (2014).

24. Wostmann, B. S. The Germfree Animal in Nutritional Studies. Annu Rev Nutr. 1 (1), 257-79, doi:10.1146/annurev.nu.01.070181.001353, (1981).

What is claimed is:

1. A method for growing a plant, the method comprising:
   (a) providing a plant growth apparatus comprising:
      (i) growth chamber having an internal volume and comprising (A) a fluid inlet and (B) a fluid outlet,
      (ii) a plant growth substrate contained within the growth chamber internal volume and constrained from exiting the internal volume via the fluid inlet and via the fluid outlet, and
      (iii) optionally a solid retaining means in the growth chamber internal volume and positioned between the fluid inlet and the plant growth substrate for restricting movement of the substrate into the fluid inlet while permitting movement of fluid through the fluid inlet into the growth chamber interior volume;
   (b) feeding sterilized water into the fluid inlet and through the plant growth substrate, thereby forming a flush eluent exiting from the fluid outlet;
   (c) feeding a liquid plant nutrient medium into the fluid inlet and through the plant growth substrate, thereby forming a nutrient eluent exiting from the fluid outlet;
   (d) optionally feeding a liquid inoculant into the fluid inlet and through the plant growth substrate, thereby forming an inoculant eluent exiting from the fluid outlet;
   (e) sowing one or more plant seeds into the plant growth substrate; then
   (f) sealing the plant growth apparatus in a hermetically sealable container having an internal volume and comprising: (i) a translucent external surface, and (ii) a microfilter as an external surface of the container, the microfilter being gas-permeable and microbe-impermeable, wherein the fluid outlet of the plant growth apparatus is in fluid communication with the microfilter, and at least a portion of the growth chamber interior volume is in optical communication with the translucent external surface; and
   (g) growing the plant in the container while preventing any microbial material from entering the sealed container during growth.

2. The method of claim 1, further comprising sterilizing the plant growth substrate before feeding the sterilized water therethrough in part (b).

3. The method of claim 1, wherein:
   (i) the plant growth substrate has been sterilized and comprises one or more water-soluble plant growth toxins before feeding the sterilized water therethrough in part (b); and
   (ii) feeding the sterilized water through the plant growth substrate in part (b) removes at least some of the plant growth toxins from the plant growth substrate via the flush eluent.

4. The method of claim 1, wherein the liquid plant nutrient medium comprises Murashige and Skoog (MS) medium.

5. The method of claim 1, wherein the liquid plant nutrient medium and the liquid inoculant are in the form of a mixture fed together into the fluid inlet in parts (c) and (d).

6. The method of claim 1, wherein the liquid inoculant comprises an aqueous extract from a known soil source community.

7. The method of claim 1, wherein the liquid inoculant comprises microorganisms from a known culture medium.

8. The method of claim 1, wherein (i) the liquid inoculant comprises one or more known types of microorganisms, and (ii) growing the plant is gnotobiotic growth.

9. The method of claim 1, wherein (i) the liquid inoculant is sterilized, and (ii) growing the plant is axenic growth.

10. The method of claim 1, wherein growing the plant comprises one or more of exposing the container to a light source and controlling the environmental temperature of the container.

11. The method of claim 1, wherein part (a) comprises providing a plurality of plant growth apparatuses for treatment according to parts (b)-(g).

12. The method of claim 11, wherein part (c) comprises:
   providing a plurality of different liquid plant nutrient media; and
   feeding a selected liquid plant nutrient medium from the plurality into the fluid inlet and through the plant growth substrate;
   wherein each of the different liquid plant nutrient media is fed at least once to a selected plant growth apparatus from the plurality thereof.

13. The method of claim 11, wherein part (d) is performed and comprises:
   providing a plurality of different liquid inoculant media; and
   feeding a selected liquid inoculant medium from the plurality into the fluid inlet and through the plant growth substrate;
   wherein each of the different liquid inoculant media is fed at least once to a selected plant growth apparatus from the plurality thereof.

14. The method of claim 11, wherein part (e) comprises:
   providing a plurality of different plant seeds; and
   sowing one or more plant seeds selected from the plurality into the plant growth substrate;
   wherein each of the different plant seeds is sown at least once to a selected plant growth apparatus from the plurality thereof.

15. The method of claim 1, wherein the fluid inlet comprises an inlet port.

16. The method of claim 1, wherein the fluid outlet comprises a perforated surface.

17. The method of claim 1, wherein the fluid inlet and the fluid outlet are positioned on different sides of the growth chamber.

18. The method of claim 1, wherein the plant growth substrate is sterilized.

19. The method of claim 1, wherein the plant growth substrate comprises a pre-determined set of one or more microorganism types.

20. The method of claim 1, wherein the plant growth substrate comprises one or more of soil, peat, vermiculite, fiberglass, calcined clay, synthetic soil substitutes, and blends thereof.

21. The method of claim 1, wherein the plant growth substrate comprises one or more of minerals, mineral colloids, organic colloids, and charcoal.

22. The method of claim 1, wherein the solid retaining means is present in the plant growth apparatus and comprises a plurality of beads.

23. The method of claim 1, wherein the container is formed from a transparent polymeric material.

* * * * *